(12) United States Patent  
Gulati et al.

(10) Patent No.: US 8,804,723 B2  
(45) Date of Patent: Aug. 12, 2014

(54) EFFICIENT CONTROL PACKET REPLICATION IN DATA PLANE

(75) Inventors: Alok Gulati, Los Gatos, CA (US); Kunal Shah, San Francisco, CA (US)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 193 days.

(21) Appl. No.: 13/453,752

(22) Filed: Apr. 23, 2012

(65) Prior Publication Data

US 2013/0279504 A1   Oct. 24, 2013

(51) Int. Cl.  
*H04L 12/28* (2006.01)

(52) U.S. Cl.  
USPC .......................................................... 370/390

(58) Field of Classification Search  
None  
See application file for complete search history.

(56) References Cited

U.S. PATENT DOCUMENTS

| | | | |
|---|---|---|---|
| 5,790,530 A * | 8/1998 | Moh et al. | 370/363 |
| 2006/0146857 A1* | 7/2006 | Naik et al. | 370/432 |
| 2008/0259784 A1 | 10/2008 | Allan et al. | |

FOREIGN PATENT DOCUMENTS

| EP | 1 107 507 A2 | 6/2001 |
|---|---|---|
| EP | 2 001 172 A2 | 12/2008 |

OTHER PUBLICATIONS

W. Fenner, Network Working Group, Request for Comments: 2236, Internet Group Management Protocol, Version 2, Nov. 1997, 25 pages.  
B. Cain et al., Network Working Group, Request for Comments: 3376, Internet Group Management Protocol, Version 3, Oct. 2002, 54 pages.

* cited by examiner

*Primary Examiner* — Kevin C Harper  
(74) *Attorney, Agent, or Firm* — Blakely Sokoloff Taylor & Zafman, LLP

(57) ABSTRACT

A method for replicating a control packet in a forwarding plane of a network element, the control packet being destined for a plurality of subscriber end stations. The forwarding plane receives the control packet from a control plane and detects a replication indicator associated with the control packet. The forwarding plane determines the plurality of subscriber end stations as each of the plurality of subscriber end stations is associated with the control packet. The forwarding plane then replicates the control packet for each of the plurality of subscriber end stations and distributes the replicated control packets to the plurality of subscriber end stations.

14 Claims, 4 Drawing Sheets

EFFICIENT CONTROL PACKET REPLICATION IN DATA PLANE

FIELD

Embodiments of the invention relate to the field of computer networking; and more specifically, to replicating control packets in a network element data plane.

BACKGROUND

Network elements are commonly separated into a control plane and a data plane (sometimes referred to as a forwarding plane or a media plane). In the case that the network element is a router (or is implementing routing functionality), the control plane typically determines how data (e.g., packets) is to be routed (e.g., the next hop for the data and the outgoing port for that data), and the data plane is in charge of forwarding that data. Many routers are configured to manage communication protocols linking tens, hundreds, or thousands of hosts. These routers may need to send identical control packets to each host under its management. These packets are often communicated from the control plane to the data plane in manner requiring the data plane handle replication of the control packet in software without any hardware assistance thereby blocking a communication channel between the control plane and data plane such as an inter-process communication (IPC) channel. This software replication of control packets in the data plane not only ties up communication channels but also results in an unnecessary use of processing power within the data plane.

SUMMARY

A method for replicating a control packet in a forwarding plane of a network element, the control packet being destined for a plurality of subscriber end stations. The forwarding plane receives the control packet from a control plane and detects a replication indicator associated with the control packet. The forwarding plane determines the plurality of subscriber end stations as each of the plurality of subscriber end stations is associated with the control packet. The forwarding plane then replicates the control packet for each of the plurality of subscriber end stations and distributes the replicated control packets to the plurality of subscriber end stations.

A network element, that is coupled with a plurality of subscriber end stations through an access network. The network element is configured to replicate a control packet meant for the plurality of subscriber end stations, which are to be bound to a multibind interface. The network element comprises a control plane and forwarding plane. The control plane includes a packet generation module and a communication module. The packet generation module is configured to generate the control packet and a set of metadata. The control packet is to be replicated and distributed at the forwarding plane. The set of metadata is in association with the control packet and includes a replication indicator and a control message route identification information. The communication module is configured to distribute the control packet and set of metadata to the forwarding plane. The forwarding plane is coupled with the control plane, and comprises a replication module. The replication module receives the control packet and set of metadata from the control plane and detects the replication indicator. In response to detecting the replication indicator, the forwarding plane determines a list of plurality of subscriber end stations identifiers based on the control message route identification information, and replicate the control packet for each of the plurality of subscriber end stations identifiers. The forwarding plane then distributes the replicated control packets to the plurality of subscriber end stations using the list of plurality of subscriber end stations identifiers.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
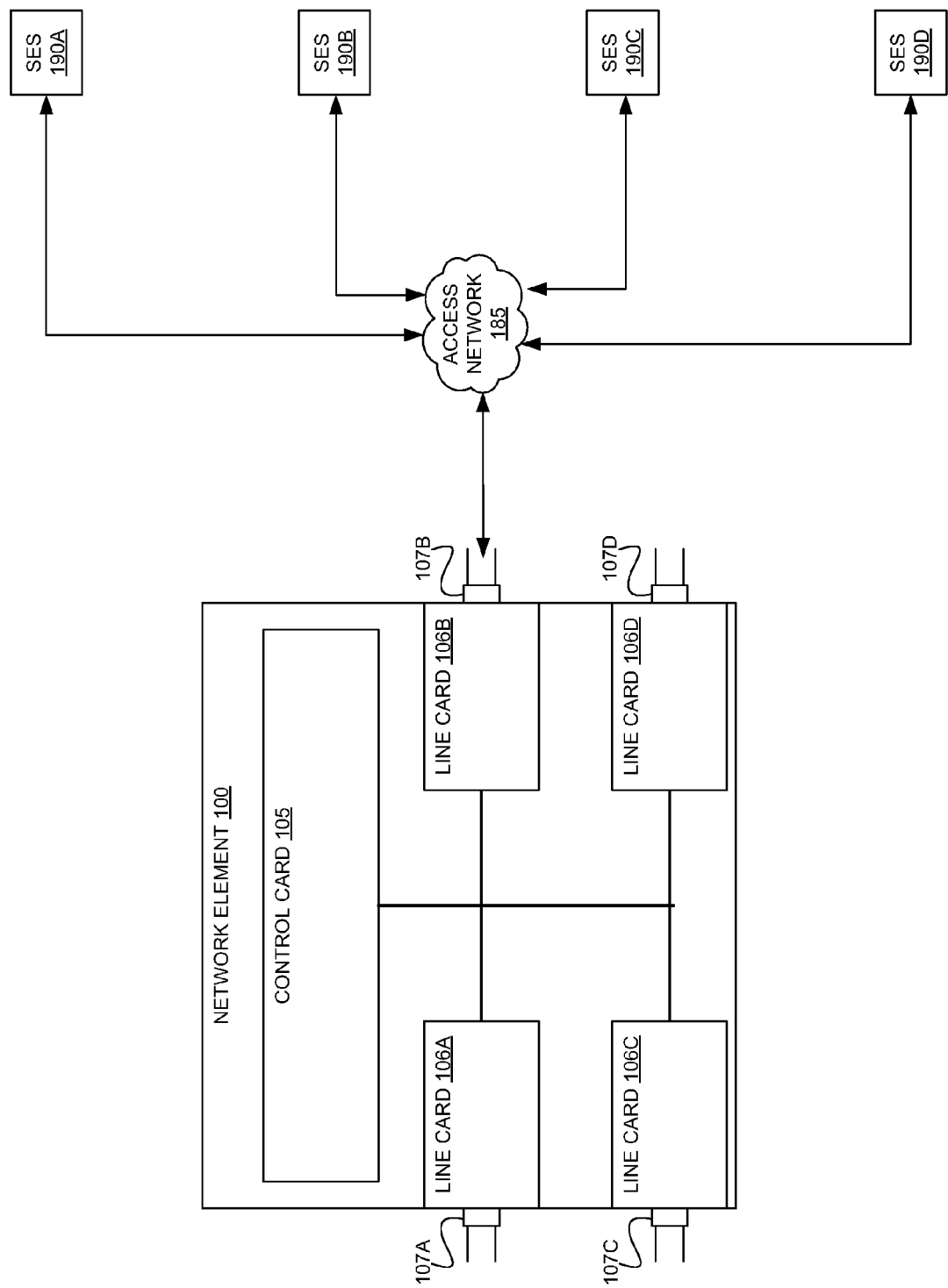
FIG. 1 is a diagram of a network element according to one embodiment of the invention.

In the following description, numerous specific details are set forth. However, it is understood that embodiments of the invention may be practiced without these specific details. In other instances, well-known structures and techniques have not been shown in detail in order not to obscure the understanding of this description. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

As used herein, a network element (e.g., a router, switch, bridge) is a piece of networking equipment, including hardware and software, that communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Network elements are commonly separated into a control plane and a data plane (sometimes referred to as a forwarding plane or a media plane). In the case that the network element is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS)), Label Distribution Protocol (LDP), Resource Reservation Protocol (RSVP)) that communicate with other network elements to exchange routes and select those routes based on one or more routing metrics.

Routes and nexthops are stored in one or more routing structures (e.g., Routing Information Base (RIB), Multicast Routing Information Base (MRIB), Label Information Base (LIB), one or more nexthop databases) on the control plane. The control plane programs the data plane with information (e.g., nexthop and route information) based on the routing structure(s). For example, the control plane programs the nexthop and route information into one or more forwarding structures (e.g., Forwarding Information Base (FIB), Multicast Forwarding Information Base (MFIB), Label Forwarding Information Base (LFIB), and one or more nexthop databases) on the data plane. The data plane uses these forwarding and nexthop structures when forwarding traffic.

Each of the routing protocols downloads route entries to a main RIB, MRIB or LIB based on certain route metrics (the metrics can be different for different routing protocols). Each of the routing protocols can store the route entries, including the route entries which are not downloaded to the main RIB, in a local RIB (e.g., an OSPF local RIB). A RIB module that manages the main RIB selects routes from the routes downloaded by the routing protocols (based on a set of metrics) and downloads those selected routes (sometimes referred to as active route entries) to the data plane. The RIB module can also cause routes to be redistributed between routing protocols.

For layer 2 forwarding, the network element can store one or more bridging tables that are used to forward data based on the layer 2 information in this data.

Typically, a network element includes a set of one or more line cards, a set of one or more control cards, and optionally a set of one or more service cards (sometimes referred to as resource cards). These cards are coupled together through one or more mechanisms (e.g., a first full mesh coupling the line cards and a second full mesh coupling all of the cards). The set of line cards make up the data plane, while the set of control cards provide the control plane and exchange packets with external network element through the line cards. The set of service cards can provide specialized processing (e.g., Layer 4 to Layer 7 services (e.g., firewall, IPsec, IDS, P2P), VoIP Session Border Controller, Mobile Wireless Gateways (GGSN, Evolved Packet System (EPS) Gateway)). By way of example, a service card may be used to terminate IPsec tunnels and execute the attendant authentication and encryption algorithms.

Certain network elements (e.g., certain edge network elements) internally represent subscriber end stations (or sometimes customer premise equipment (CPE) such as a residential gateway (e.g., a router, modem)) using subscriber circuits. A subscriber circuit uniquely identifies within the network element a subscriber session and typically exists for the lifetime of the session. Thus, a network element typically allocates a subscriber circuit when the subscriber connects to that network element, and correspondingly de-allocates that subscriber circuit when that subscriber disconnects. Each subscriber session represents a distinguishable flow of packets communicated between the network element and a subscriber end station (or sometimes CPE such as a residential gateway or modem) using a protocol, such as the point-to-point protocol over another protocol (PPPoX) (e.g., where X is Ethernet or Asynchronous Transfer Mode (ATM)), Ethernet, 802.1Q Virtual LAN (VLAN), Internet Protocol, or ATM). A subscriber session can be initiated using a variety of mechanisms (e.g., manual provisioning a dynamic host configuration protocol (DHCP), DHCP/client-less internet protocol service (CLIPS) or Media Access Control (MAC) address tracking). For example, the point-to-point protocol (PPP) is commonly used for DSL services and requires installation of a PPP client that enables the subscriber to enter a username and a password, which in turn may be used to select a subscriber record. When DHCP is used (e.g., for cable modem services), a username typically is not provided; but in such situations the MAC address of the hardware in the subscriber end station (or CPE) is provided. The use of DHCP and CLIPS on the network element captures the MAC addresses and uses these addresses to distinguish subscribers and access their subscriber records.

Within certain network elements, multiple "interfaces" may be configured. As used herein, each interface is a logical entity, typically configured as part of a context, which provides higher-layer protocol and service information (e.g., Layer 3 addressing) and is independent of physical ports and circuits (e.g., ATM PVC (permanent virtual circuits), 802.1Q VLAN circuits, QinQ circuits, DLCI circuits). Subscriber records in a authentication, authorization, and accounting (AAA) server identify, in addition to the other subscriber configuration requirements, to which context (e.g., which of the virtual routers) the corresponding subscribers should be bound within the network element. As used herein, a binding forms an association between a physical entity (e.g., port, channel) or a logical entity (e.g., circuit such as a subscriber circuit or logical circuit (a set of one or more subscriber circuits)) and a context's interface over which network protocols (e.g., routing protocols, bridging protocols) are configured for that context. Subscriber data flows on the physical entity when some higher-layer protocol interface is configured and associated with that physical entity. Furthermore, interfaces may be configured as a multibind interface, meaning that multiple circuits can be bound to that IF, or non-multibind interface, meaning that a single circuit is bound to the IF.

Internet Engineering Task Force (IETF) standards track Request for Comments (RFC) 3376, *Internet Group Management Protocol* (*IGMP*), *Version* 3, by B. Cain et al. (October 2002), describes that some routers are further configured as multicast routers. In such routers, the control plane may be responsible for managing IGMP group memberships while the data plane is responsible for forwarding data and control packets to other routers and hosts.

On an IGMP enabled interface (IF), an IGMP control process sends out a periodic general query (GQ) on that IF to determine which hosts are members of which groups. For an IF which is bound only to a single circuit, the GQ is sent out periodically on that circuit using internet protocol (IP) raw sockets. However, if the IF is a multibind IF then the GQ is sent out on all circuits bound to the interface using IPC communication.

For example, an IGMP control process in the control plane creates an IGMP GQ packet and then sends an IPC message to each line card (LC) in the data plane that has a circuit of that IF. The IPC message will include the GQ packet and a list of circuit handles that reside on that LC to which the GQ packet need be sent. Each LC takes the list of circuit handles and replicates the IGMP GQ packet on each of the circuits in the list. The LC does this by unicasting the GQ one at a time to a multicast nexthop of each circuit handle in the list. This process is repeated periodically, every time the GQ on an IGMP enabled IF needs to be sent out.

There are a number of downsides with this scenario. First, a multicast router can include many multibind IFs, and each such interface can have a few thousand circuits bound to it. The IGMP control process cannot pack all the circuits of an interface in a single IPC message; therefore, multiple IPC messages have to be sent from the control plane to the data plane in order to send out the GQ on all the circuits of a multibind IF. Second, the IGMP control process must identify which circuit handles of a multibind interface belong to which line cards in order to pack a list of those circuits into IPC messages particular to each LC. This is computationally intensive and becomes expensive as the number of circuit handles or multibind IFs increases. Third, during the processing of each IPC message, replication is done in software without any hardware assistance thereby blocking IPC receive threads while software is processing the circuit handle list and sending GQs one by one on each circuit. Finally, since replication is done in software on each LC, there is an unnecessary use of processor bandwidth on the LC and code maintenance becomes more complex since the same IGMP GQ message is sent from the control plane to data plane on different paths for multibind IFs versus non-multibind IFs.

FIG. 1 is a diagram of a network element according to one embodiment of the invention. A network element 100 illustrated in FIG. 1 includes a control card 105 coupled with line cards 106A-106D. The line cards 106A, 106B, 106C, and 106D are respectively coupled with ports 107A, 107B, 107C, and 107D. Each of the ports 107A-107D carries traffic. The traffic can be voice, data, etc. Each of the line cards 106A-106D receives traffic and transmits traffic over the fibers 107A-107D. The line cards 106A-106D are coupled with a control card 101. The network element 100 is coupled with an access network 185 on port 107B which couples the network element 100 with a plurality of subscriber end stations (SESs) 190A-190D.

While an exemplary architecture of a network element is illustrated, an alternative embodiment may use other architectures. For example, FIG. 1 shows a single bus interconnecting the line cards and the control card. Alternative embodiments may use an alternative technique (e.g., a full mesh, multiple point to point links, combinations of the above, etc.).

Figure 2:
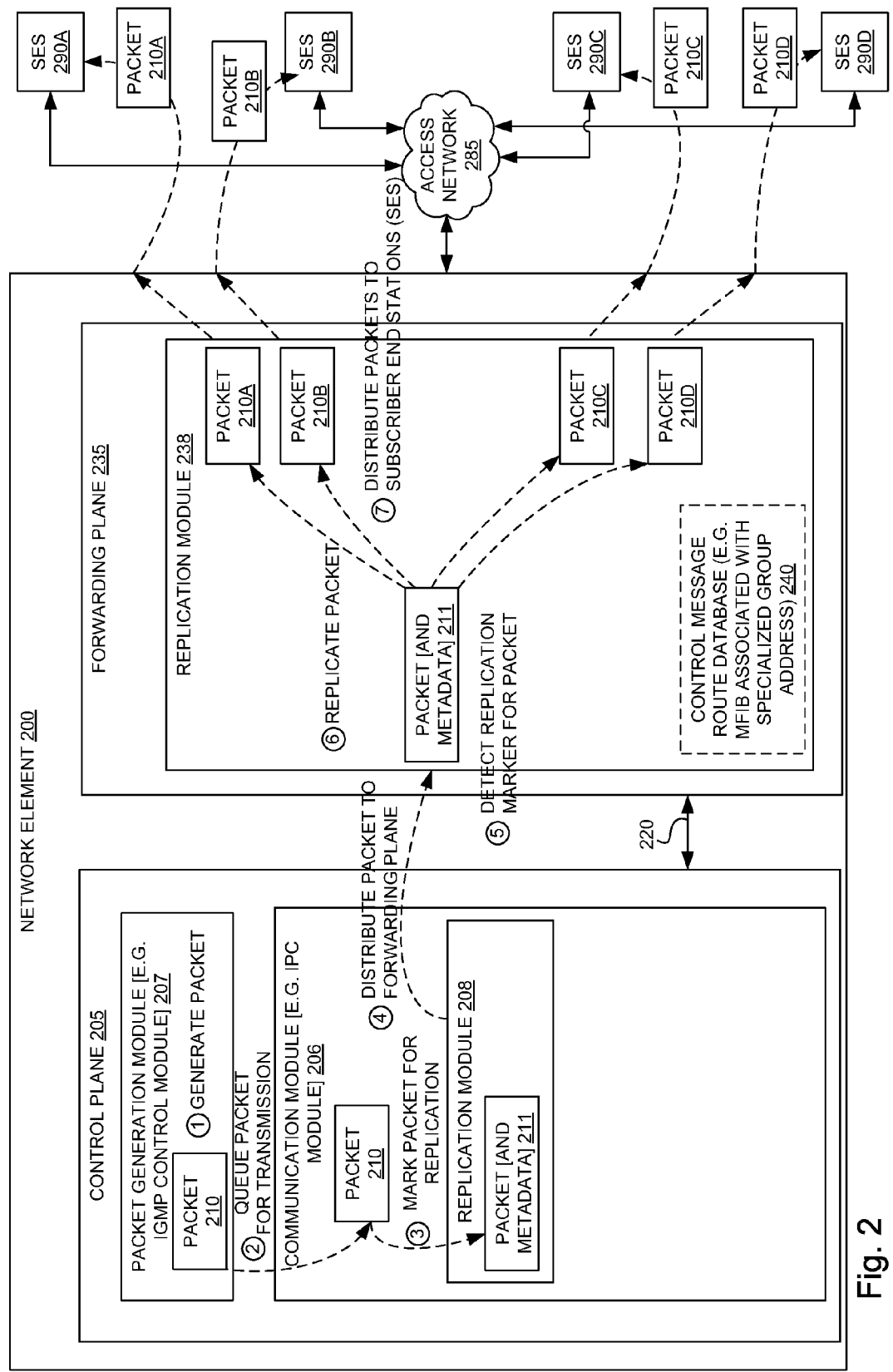
FIG. 2 illustrates an exemplary network element that replicates control packets in the forwarding plane according to one embodiment.

FIG. 2 illustrates an exemplary network element that replicates control packets in the forwarding plane according to one embodiment. In FIG. 2, network element 200 is coupled with an access network 285 which is further coupled with a plurality of other network elements. In FIG. 2 the plurality of other network elements are illustrated as a plurality of subscriber end stations (SES) 290A-290D. In FIG. 2, each of the plurality of SESs is on a circuit bound to a multibind IF within a forwarding plane 235 of network element 200. The forwarding plane 235 is coupled with a control plane 205 via a communications channel 220 such as an IPC channel. The control plane 205 includes a packet generation module 207 that is coupled with a communication module 206. The packet generation module 207 may be any module responsible for communicating packets with a plurality of SESs that are on circuits bound to a multibind interface. For example, the packet generation module 207 may be an IGMP control process that is responsible for managing IGMP group member and IGMP packet distribution. Furthermore, the communication module 206 may be any appropriate module for communicating data packets from the control plane 205 to the forwarding plane 235. For example, the communication module 206 may be an IPC process designed to pass messages to a corresponding IPC process within the forwarding plane 235.

FIG. 2 illustrates a series of stages in the transmission of a packet 210 that is generated by the packet generation module 207 and communicated on to the plurality of SESs 290A-290D. In FIG. 2, various points are denoted with a number within a circle. Within the packet generation module 207 a packet 210 is generated at point 1. This packet may be any packet that needs to be replicated and sent to a plurality of SESs that are bound to circuits on a multibind interface. For example, the packet 210 may be a GQ packet as part of IGMP management. At point 2, this packet 210 is sent to the communication module 206 to be queued for transmission to the plurality of SESs 290A-290D. Within the communication module 206, a replication module 208 is responsible for identifying that the packet 210 requires processing for replication at the forwarding plane 235 and so marks the packet 210 for replication at point 3. A packet 210 may be marked for replication in a number of ways. For example, the replication module 208 may generate a packet 211, based on the packet 210, that is addressed to a designated group that marks the packet for replication with connection to a specific multibind IF. Furthermore, the packet 211 may include a special flag that indicates the packet should be replicated within the forwarding plane 235. Another strategy for indicating that the packet 211 should be replicated in the forwarding plane 235 is to generate packet metadata to send to the forwarding plane 235 in association with the packet 211 that includes information used by a replication module 238 in the forwarding plane 235. For example, the packet metadata may include a replication flag and a multibind IF identifier. In another embodiment, the metadata includes a replication flag and a group address wherein the group address is associated with the multibind IF. At point 4, the communication module 206 distributes the packet 211, and metadata in those cases utilizing it, to the forwarding plane 235. The forwarding plane 235, detects a marker which indicates that replication is needed for the packet 211 at point 5 and hands the packet and any associated metadata off to the replication module 238. The replication module 238 uses the packet 211, and the optional metadata to determine how the packet 211 should be replicated.

In the case that the original packet 210 was a GQ for IGMP, each replicated packet 210A-210D will be largely, if not wholly, identically and merely be sent out on different circuits associated with a common multibind IF. Therefore at point 6, the replication module 238 identifies the appropriate multibind IF and replicates the packet for each circuit bound to the multibind IF. At point 7, the forwarding plane 235 distributes the plurality of replicated packets 210A-210D out to the plurality of SESs.

In one embodiment, as later depicted in FIG. 2, the forwarding plane 235 is comprised of a plurality of line cards (LCs). In such embodiment, it may be that each LC is responsible for replicating the packet 211 for each circuit of the multibind IF handled by that LC; in other words a single multibind IF may comprise multiple circuits on multiple LCs. Therefore, each LC will identify those circuits on the LC that are bound to the multibind IF for that packet 211 and replicate the packet 211 to generate a plurality of packets 210A-210D to later distribute to the plurality of SESs 290A-290D.

In one embodiment, the forwarding plane 235 includes a control message route (CMR) database 240 while in another embodiment the CMR database 240 exists within the control plane 205 and only portions of the CMR database exist within the forwarding plane 235 as described later. The CMR database 240 is used to maintain a list of circuits that are outgoing IFs for a given group address. In such an embodiment, when an application, e.g. an application running in the packet generation module 207, is enabled on a multibind IF, the application creates a CMR corresponding to that multibind IF. The CMR comprises a source address, which is the IP address of the multibind IF, and a group address. The source address and group address can be used as CMR identification information to allow embodiments to distinguish lists of circuits for different CMRs. The group address may generally be any IP address chosen by the application according to its requirements, though generally the address should not overlap with other multicast data group addresses. When a circuit is bound to that multibind IF, the application detects the additional circuit and adds a circuit identifier, i.e. circuit handle, as an outgoing IF on the corresponding CMR within the CMR database 240. Similarly, when a circuit is unbound from that multibind IF, the circuit identifier is removed from the CMR database 240. In the case that multiple LC services the same multibind IF, each LC may download a list of CMRs that correspond to the circuits handled by that LC, for example the LC may load a subset of the CMR database 240 into one or more packet forwarding engines (PFE) on that LC. As the CMR database 240 is updated then the corresponding information is updated with each LC. In such an embodiment, whenever the application wants to send a packet that needs to be replicated to all circuits on the corresponding multibind IF, e.g. when periodic timer expires indicating the need to send a control packet, then the application sends the packet out to the multibind IF. Along with the control packet, the application provides the IF's source address and the application's chosen group address, for example as associated metadata, and optionally sets a replication flag to indicate the control packet needs to be replicated in the forwarding plane 235. On receiving the control packet at the forwarding plane 235, the replication module 238 will detect a replication marker, either by group address or by the replication flag, and use the source address and group address to lookup the CMR from the CMR database 240, or if in the LC from the CMR list maintained in that LC which is a portion of the CMR database 240. The forwarding plane 235 is then able to replicate the packet as needed for each circuit and distribute the packet on to the corresponding SESs. In one embodiment, the replication module 238 is able to take advantage of a multicast forwarding information base (MFIB) to replicate the packets and hence inherits the benefits of two stage replication and hardware assist. In further embodiments, the forwarding plane 235 is able to skip a reverse path forwarding (RPF) check for each replicated packet thereby decreasing processing needed for each replicated packet.

In one example, an application running in the packet generation module 207 of the control plane 205 is an IGMP management application that is responsible for a multibind IF comprising a plurality of circuits to the SESs 290A-290D. The IGMP management application creates a CMR database corresponding to the multibind IF. When a circuit is bound to the multibind IF, the IGMP management application adds a CMR entry corresponding to that circuit which includes the source IP address of the multibind IF and a group address corresponding to the IGMP management application. Furthermore the added entry includes a circuit identifier, i.e. circuit handler, as an outgoing IF (OIFs) for that multibind IF. The IGMP management application sends the CMR database, or a portion thereof, to a multicast infrastructure daemon in the forwarding plane 235 such that each portion of the forwarding plane 235, e.g. each line card, has at least the portion of the CMR database corresponding to circuits being handled by that LC. The IGMP management application uses a timer to track when a GQ message should be sent out to members of the multibind IF managed by the application. When the GQ timer on the multibind IF expires, the IGMP management application creates a GQ packet and sends it to the forwarding plane with information marking the GQ packet as requiring replication on the multibind IF. At the forwarding plane 235, each portion of the forwarding plane 235, e.g. at each LC, the GQ packet is received. If the GQ packet is not marked for replication then the packet is sent out to the corresponding circuit handle. If the GQ packet is marked for replication then the corresponding source IP address and group address are used to determine for which OIFs the packet should be replicated and sent by performing a lookup in the CMR database, or portion thereof. The GQ packet can then be replicated and sent on the corresponding circuits, without doing an RPF check, via a hardware path that takes advantage of hardware based replication. In one embodiment, the relevant portion of the CMR database can be included in a multicast forwarding information base (MFIB) and existing replication hardware can be advantageously used to replicate the packet for each circuit handle.

Such embodiment have numerous advantages. First, once the CMR is included in the forwarding plane 235, or portion thereof, future control messages can be sent out simply by sending the control message to the correct LC with the correct source IP address and group address as metadata to identify the CMR. The packet generation module 207 need not include information identifying each individual circuit handle as such information will exist in the CMR database. Second, the portions of the forwarding plane 235 may implement hardware based replication that is significantly faster and scalable for a large number of circuits on a multibind IF. Third, the packet generation module 207 need not keep track of which circuits reside on a particular portion of the forwarding plane 235. Fourth, control messages from the packet generation module 205 to the forwarding plane 235 are sent using a common code path whether sent to a non-multibind IF or a multibind IF.

Figure 3:
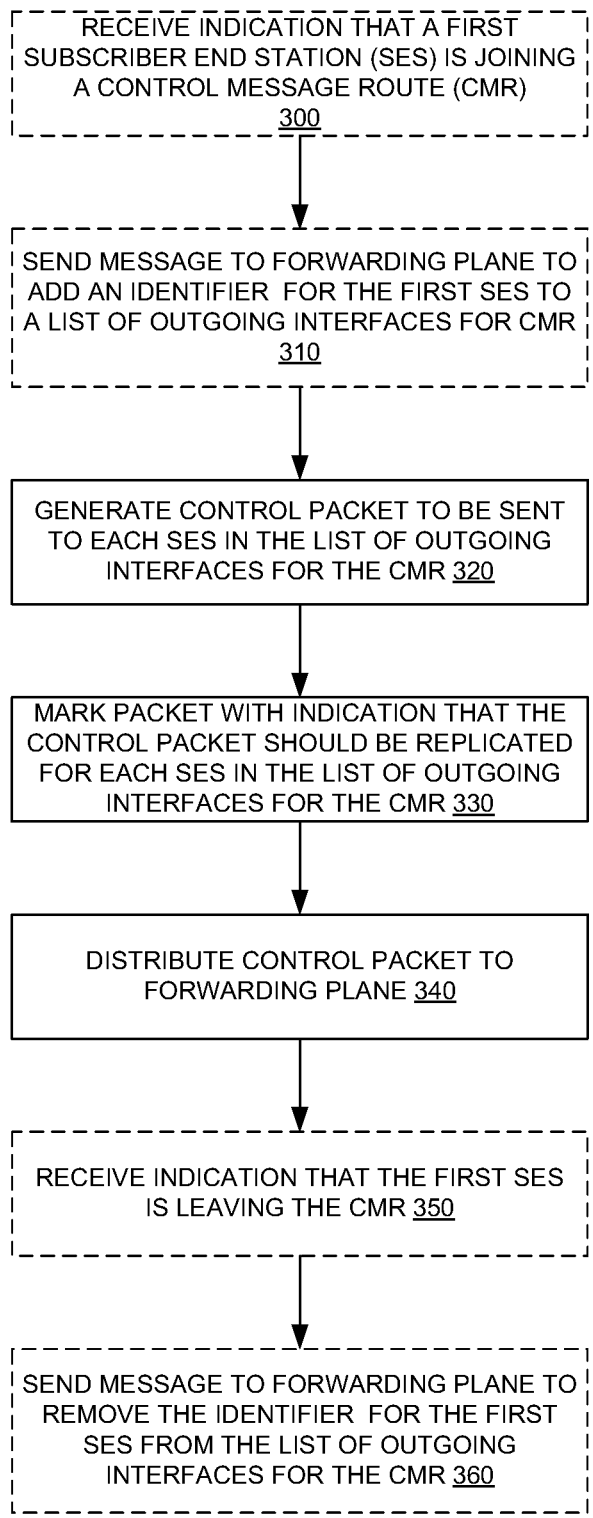
FIG. 3 is a flow diagram that illustrates exemplary operations for managing control messages in a control plane according to one embodiment of the invention.

FIG. 3 is a flow diagram that illustrates exemplary operations for managing control messages in a control plane according to embodiments of the invention. In FIG. 3, optional steps are shown in dashed markings.

The flow diagram starts with adding entries to a control message route (CMR) database in the option steps of 300 and 310. At step 300, the control plane receives an indication that a first subscriber end station (SES) is joining a CMR. In one embodiment, this is a notification that a circuit associated with the SES is being bound to a multibind IF associated with a CMR. At step 310, the control plane sends a message to the forwarding plane to add an identifier for the first SES to a list of outgoing interfaces (OIFs) for the CMR. In one embodiment this is a message to add a circuit identifier, e.g. circuit handle, to a list of circuit handles for that CMR and the CMR may be identified by the source IP address of a multibind IF and a group address corresponding to an application using the CMR.

At step 320, a module in the control plane generates a control packet that is to be sent to each SES in the list of OIFs for the CMR associated with that module. The control packet is then marked with an indication that the control packet should be replicated for each SES in the list of OIFs for the CMR in 330. In one embodiment, that includes marking the control packet with metadata including a group address for the CMR and a replication flag which can later be detected in a forwarding plane. Another embodiment may mark the control packet by addressing the control packet to a special group address that is detected at the forwarding plane. At step 340, the control packet is distributed to the forwarding plane along with any generated metadata for the control packet.

At optional step 350, the control plane receives an indication that the first SES is leaving the CMR. For example, the control plane may receive a message that the circuit is being unbound from, or is no longer bound to, the multibind IF. In response, the control plane sends a message to remove the identifier for the first SES from the list of OIFs for the CMR in step 360.

Figure 4:
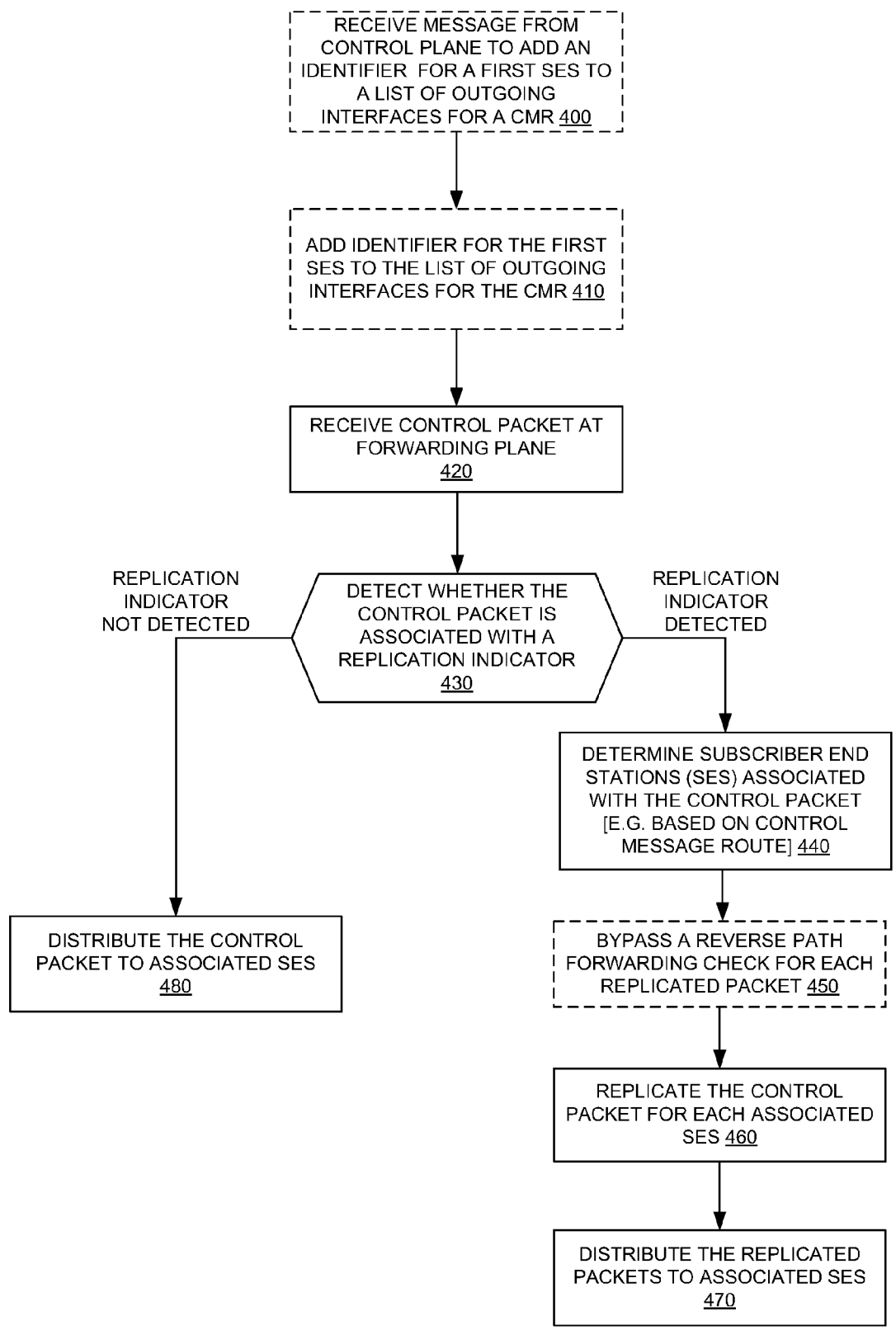
FIG. 4 is a flow diagram that illustrates exemplary operations for replicating control messages in a forwarding plane according to one embodiment of the invention.

FIG. 4 is a flow diagram that illustrates exemplary operations for replicating control messages in a forwarding plane according to embodiments of the invention. In FIG. 4, optional steps are shown in dashed markings.

FIG. 4 begins at 400 with receiving a message from a control plane with information telling the forwarding plane to add an identifier for a first subscriber end station (SES) to a list of outgoing interfaces (OIF) for a control message route (CMR). In one embodiment, the identifier is a circuit identifier for a circuit on which the SES is bound to a multibind IF and the list of OIFs is included in a multicast forwarding information base (MFIB) in association with the multibind IF. In response to receiving the message, the forwarding plane adds the identifier for the first SES to the list of OIFs for that CMR in step 410. At step 420, the forwarding plane receives a control packet. At step 430, the forwarding plane detects whether the control packet is associated with a replication indictor. In one embodiment the replication indicator may be that control packet is addressed to a special group addressed associated with the need to replicate the packet while another embodiment utilizes metadata associated with the control packet. The metadata may include a replication flag and a special group address associated with a particular CMR which are detected by the forwarding plane.

In the case that the replication indicator is detected, the flow continues at step 440 and determines which SESs are associated with the control packet. In one embodiment, this is performed by extracting a source IP address and group address from the control packet and corresponding metadata. Using this information the forwarding plane can identify a list of OIFs associated with a CMR for that source IP address and group address; as previously described this list of OIFs may be a list of circuit handles bound to a particular multibind IF and the group address may be associated with a specific packet generation module in the control plane. For example, an IGMP control application may be running in the control plane that utilizes a multibind IF to communicate with a plurality of SESs. In the case of an IGMP control application, the list of OIFs can be stored in a multicast forwarding information base (MFIB). Since the forwarding plane is confident of the source of the control packet based on the replication flag, the forwarding plane can bypass a reverse path forwarding (RPF) check for each SES at step 450. Using the list of SESs for that CMR, the forwarding plane replicates the control packet for each associated SES in step 460. At step 470, the forwarding plane distributes the replicated packets to the associated SESs. In the case that the replication indicator is not detected, the forwarding plane continues by distributing the control packet to the associated SES at step 480.

Different embodiments of the invention may be implemented using different combinations of software, firmware, and/or hardware. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

What is claimed is:

1. A method for replicating a control packet in a forwarding plane of a network element, the control packet being destined for a plurality of subscriber end stations, wherein the method comprises:
   receiving a message from a control plane that indicates the forwarding plane should add an identifier for one of the plurality of subscriber end stations to a list of outgoing interfaces for a multibind interface;
   adding, in response to receiving the message, the identifier for the one of the plurality of subscriber end stations to the list of outgoing interfaces for the multibind interface;
   receiving the control packet from the control plane, wherein the control plane generated the control packet;

detecting a replication indicator associated with the control packet;

determining the plurality of subscriber end stations, each of the plurality of subscriber end stations being associated with the control packet, wherein said determining includes looking up the list of outgoing interfaces for the multibind interface;

replicating the control packet for each of the plurality of subscriber end stations; and distributing the replicated control packets to the plurality of subscriber end stations.

2. The method of claim 1, further comprising:

bypassing a reverse path forwarding check for each replicated control packet based on a presence of the replication indicator in association with the control packet.

3. The method of claim 1, wherein the control packet is addressed to a designated group address that indicates replication is required based on the designated group address.

4. The method of claim 1, further comprising:

receiving a set of packet metadata in association with the control packet, wherein the set of packet metadata includes a replication flag as the replication indicator.

5. The method of claim 1, wherein the control packet is a general query for an Internet group management protocol (IGMP) group.

6. A network element, to be coupled with a plurality of subscriber end stations through an access network, configured to replicate a control packet meant for the plurality of subscriber end stations, wherein the plurality of subscriber end stations are to be bound to a multibind interface of the network element, the network element comprising:

a control plane comprising:
 a packet generation module configured to:
  generate the control packet, wherein the control packet is to be replicated and distributed at a forwarding plane, and
  generate a set of metadata in association with the control packet that includes a replication indicator and a control message route identification information, and
 a communication module configured to distribute the control packet and the set of metadata to the forwarding plane; and the forwarding plane, coupled with the control plane, comprising a plurality of line cards that each service one or more circuits bound to the multibind interface, wherein each line card is configured to include a list of circuit identifiers in association with the control message route identification information, and wherein the list of circuit identifiers includes at least identifiers the for circuits it handles that are bound to the multibind interface, wherein the plurality of line cards is configured to:

receive the control packet and the set of metadata from the control plane, detect the replication indicator, in response to detecting the replication indicator, determine a plurality of subscriber end station identifiers based on the control message route identification information, replicate the control packet for each of the plurality of subscriber end station identifiers, and distribute the replicated control packets to the plurality of subscriber end stations using the plurality of subscriber end station identifiers.

7. The network element of claim 6, wherein the forwarding plane is further configured to bypass a reverse path forwarding check for each replicated control packet based on a presence of the replication indicator in association with the control packet.

8. The network element of claim 6, wherein the control message route identification information includes a source address associated with the multibind interface and a group address associated with an application running in the packet generation module.

9. The network element of claim 6, wherein the packet generation module is further configured to run an Internet group management protocol (IGMP) group management application.

10. A tangible non-transitory machine-readable storage medium comprising instructions for a microprocessor of a forwarding plane, which, when executed by the microprocessor, cause the microprocessor to perform operations comprising:

receiving a message from a control plane that indicates the forwarding plane should add an identifier for one of a plurality of subscriber end stations to a list of outgoing interfaces for a multibind interface;

adding, in response to receiving the message, the identifier for the one of the plurality of subscriber end stations to the list of outgoing interfaces for the multibind interface;

receiving a control packet from the control plane, wherein the control plane generated the control packet;

detecting a replication indicator associated with the control packet;

determining the plurality of subscriber end stations, each of the plurality of subscriber end stations being associated with the control packet;

replicating the control packet for each of the plurality of subscriber end stations; and distributing the replicated control packets to the plurality of subscriber end stations.

11. The tangible non-transitory machine-readable storage medium of claim 10, wherein the operations further comprise:

bypassing a reverse path forwarding check for each replicated control packet based on a presence of the replication indicator in association with the control packet.

12. The tangible non-transitory machine-readable storage medium of claim 10, wherein the control packet is addressed to a designated group address that indicates replication is required based on the designated group address.

13. The tangible non-transitory machine-readable storage medium of claim 10, wherein the operations further comprise:

receiving a set of packet metadata in association with the control packet and wherein the set of packet metadata includes a replication flag as the replication indicator.

14. The tangible non-transitory machine-readable storage medium of claim 10, wherein the control packet is a general query for an Internet group management protocol (IGMP) group.

* * * * *

UNITED STATES PATENT AND TRADEMARK OFFICE
CERTIFICATE OF CORRECTION

| | | |
|---|---|---|
| PATENT NO. | : 8,804,723 B2 | Page 1 of 1 |
| APPLICATION NO. | : 13/453752 | |
| DATED | : August 12, 2014 | |
| INVENTOR(S) | : Gulati et al. | |

It is certified that error appears in the above-identified patent and that said Letters Patent is hereby corrected as shown below:

In the specification

In Column 6, Line 4, delete "control card 101." and insert -- control card 105. --, therefor.

In Column 9, Line 6, delete "generation module 205" and insert -- generation module 207 --, therefor.

Signed and Sealed this
Third Day of November, 2015

Michelle K. Lee
*Director of the United States Patent and Trademark Office*